(12) United States Patent
Allen

(10) Patent No.: US 9,832,834 B1
(45) Date of Patent: Nov. 28, 2017

(54) TOILET SEAT LIGHTING APPARATUS

(71) Applicant: Kelvin Allen, Houston, TX (US)

(72) Inventor: Kelvin Allen, Houston, TX (US)

( * ) Notice: Subject to any disclaimer, the term of this patent is extended or adjusted under 35 U.S.C. 154(b) by 0 days.

(21) Appl. No.: 15/530,115

(22) Filed: Dec. 5, 2016

(51) Int. Cl.
| | | |
|---|---|---|
| *H05B 33/00* | (2006.01) | |
| *H05B 33/08* | (2006.01) | |
| *A47K 13/24* | (2006.01) | |
| *H05B 37/02* | (2006.01) | |
| *F21V 33/00* | (2006.01) | |
| *F21V 23/04* | (2006.01) | |
| *F21Y 115/10* | (2016.01) | |
| *F21Y 113/10* | (2016.01) | |

(52) U.S. Cl.
CPC ......... *H05B 33/0872* (2013.01); *A47K 13/24* (2013.01); *F21V 23/0471* (2013.01); *F21V 33/004* (2013.01); *H05B 33/0815* (2013.01); *H05B 37/0227* (2013.01); *F21Y 2113/10* (2016.08); *F21Y 2115/10* (2016.08)

(58) Field of Classification Search
CPC ......... E03D 5/105; E03D 9/005; E03D 9/032; E03D 3/02; E03D 3/06; E03D 5/10; E03D 1/32; E03D 1/34; E03D 1/36; E03D 9/00; E03D 9/052; E03D 3/04; E03D 9/05; E03D 9/007; E03D 9/08; E03D 11/02
See application file for complete search history.

(56) References Cited

U.S. PATENT DOCUMENTS

2015/0059076 A1* 3/2015 Tiagai .................. E03D 9/08 4/447
2015/0342574 A1* 12/2015 Hall .................... A61B 10/007 600/573

\* cited by examiner

*Primary Examiner* — Monica C King
(74) *Attorney, Agent, or Firm* — Kenneth D. Baugh

(57) ABSTRACT

A toilet seat lighting apparatus 10 is provided so that and individual can enter a bathroom at night to use the toilet 12 which provides light and allows the user to determine if the toilet seat 20 is up or down without turning on the bathroom light. The apparatus is provided with a motion sensor circuit 30 which detects motion when an individual enters the bathroom and a pressure sensor circuit 40 which is activated by the motion sensor circuit. Once the pressure sensor circuit 40 is activated it will activate switch 72 which in turn will illuminate a red light 26 to indicate the toilet seat 20 is down or a green light 28 to indicate the seat 20 is up.

10 Claims, 2 Drawing Sheets

TOILET SEAT LIGHTING APPARATUS

TECHNICAL FIELD

This invention relates to a toilet seat, lighting apparatus and more particularly to an apparatus which provides a light when an individual enters a bathroom in the dark while also providing a lighted indicator when a toilet seat is up and another lighted indicator when a toilet seat is down. It is common that individuals for various reasons enter the bathroom at night without turning on the bathroom light. For example for some its temporarily blinding to turn on the light and for others it may be a desire to save energy. For whatever reason one may chose not to turn on a bathroom light at night we know that moving around in the dark and then attempting to use the toilet without a clear indication as to whether the toilet seat is up or down may create an uncomfortable and undesirable situation for the individual. The most obvious way to address this issue is by leaving the bathroom light on at night. Clearly this can disturb one's sleep as well as have a cost factor associated therewith. Sometimes this problem is addressed by using what is called a night light. A common night light used today may require that it be plugged into an electric outlet and then turned on which can be difficult in the dark. To avoid this the night light is frequently left on which of course also has a cost factor and may also interfere with one's sleep. The night light becomes the more desirable solution rather than leaving the bathroom light on. However even when you use such lighting arrangements it is not always clear whether the toilet seat of your toilet is up or down. This of course can create an uncomfortable situation if the night light is not providing sufficient lighting so the toilet seat can be seen. Accordingly using the night light or leaving the bathroom light on are still less than ideal solutions.

Although there are a number of different night light arrangements there is an ongoing need to improve the lighting in the bathroom at night while specifically addressing the need to minimize and/or eliminate the potential discomfort one may encounter when it is unclear whether the toilet seat is up or down. One way to address this need is to provide for a toilet seat lighting system that allows a light to be turned on when an individual enters a bathroom at night to use the toilet while also allowing the individual to determine if the toilet seat is up or down.

BACKGROUND ART

Attempts have been made to provide night lights for toilets. One such device is illustrated in U.S. Pat. No. 5,263,206. This invention relates to a toilet light assembly. In this device a flexible moisture impermeable, transparent tube is positioned under an upper rim of the toilet bowl and extends therearound. A plurality of spaced apart electrical lamps lay within the tube and are wired with a switch and a power source for receiving electrical power. The switch is position sensitive and may be fixed to the toilet seat, the seat being capable of assuming a horizontal or a vertical orientation. A first latching switch and a second latching switch are included, each of which may energize the lamps by either lifting the toilet seat into a vertical position or by lowering the hinged member into a horizontal position, respectively. A delay circuit de-energizes the lamps by breaking the circuit after a pre-set delay time.

Another apparatus is disclosed in U.S. Pat. No. 3,982,288. This patent discloses an improved toilet seat which additionally serves as a night light and which aids a person in finding a toilet seat in a darkened bathroom during a night time. The toilet seat is made of resins or plastics that is clear or colored-tinted and the toilet seat has a clear lucite rod cast within its center. One end of the lucite rod is aligned with an electric lamp stationarily supported and wherein the lamp light automatically goes out when the toilet seat is raised.

These systems do serve as a night light thus minimizing some of the adverse effects of the darkness of the bathroom environment at night. However, these do not provide a lighting apparatus which acts as a night light which is activated when an individual enters the bathroom while at the same time providing an indication of the position of the toilet seat on the toilet. Such a system is desirable.

Therefore there is an ongoing need for an apparatus that is activated when an individual enters a bathroom while at the same time providing a lighted indicator of the position of the toilet seat on the toilet.

DISCLOSURE OF THE INVENTION

A toilet seat lighting apparatus is provided which is activated when one enters the bathroom at night to provide light in the bathroom while allowing the user to determine if the toilet seat is up or down. The apparatus is provided with a motion sensor circuit which detects the motion of an individual when entering the bathroom. A pressure sensor circuit is activated by the motion sensor circuit to activate a lamp switching circuit which will activate a red light to illuminate and provide light in the bathroom while also providing a indicator if the toilet seat is up or activate a green light to illuminate and provide light in the bathroom while also providing an indicator if the toilet seat is down.

BRIEF DESCRIPTION OF THE DRAWING

The details of the invention will be described in connection with the accompanying drawing in which.

BEST MODE FOR CARRYING OUT THE INVENTION

Figure 1:
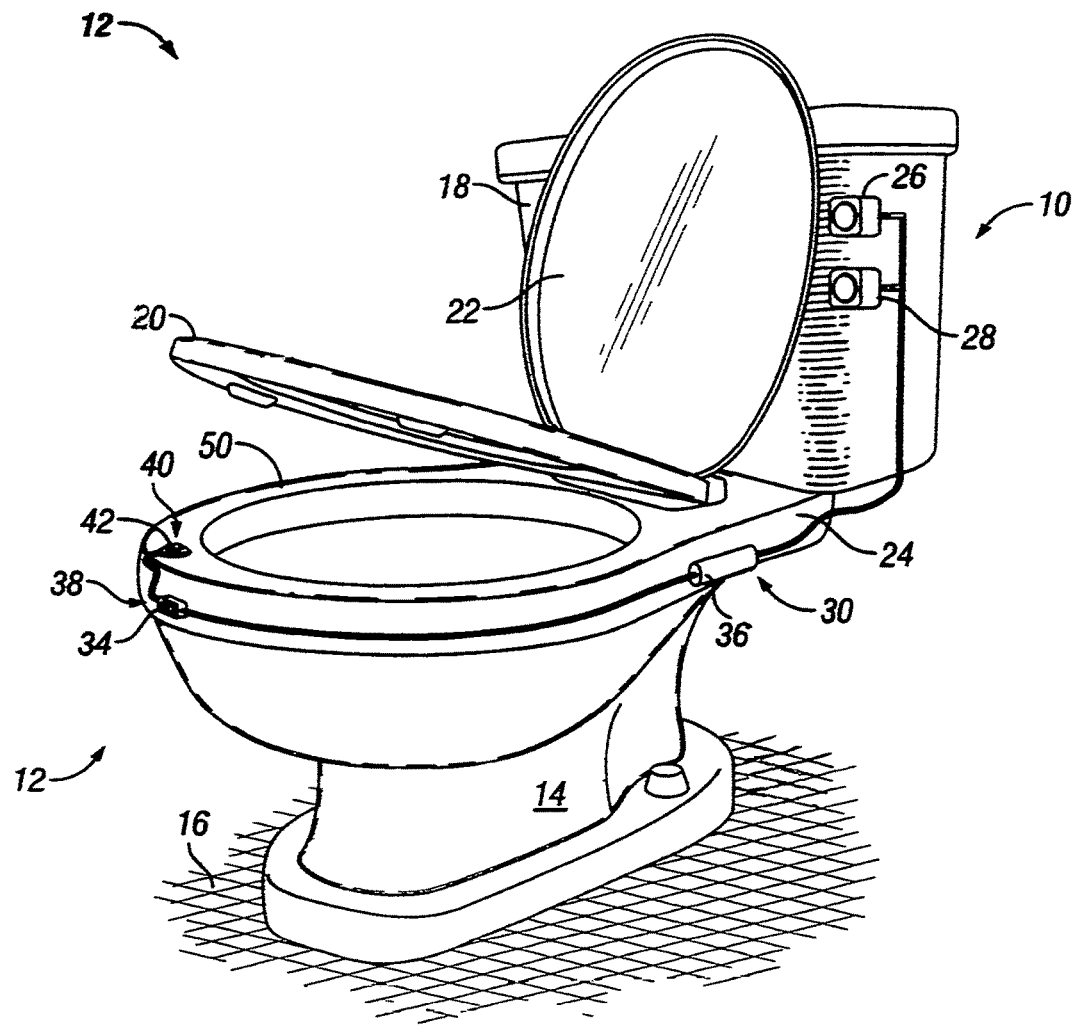
FIG. 1 is a perspective view illustrating a toilet which is used in conjunction with the toilet seat lighting apparatus which lights the toilet seat in accordance with the principles of the invention.

Referring to FIG. 1, a toilet seat lighting apparatus is shown, generally designated, by the numeral, 10. The lighting apparatus 10 is used in conjunction with a toilet, generally designated, by the numeral, 12. The toilet 12 includes a bowl 14 which is mounted to the floor 16 of the bathroom and a water tank 18 coupled to the bowl in a well known manner. The toilet 12 also includes a seat 20 and a lid 22 which are pivotally coupled to the back 24 of the bowl 14 so that the seat and lid can be lowered to a horizontal position to cover the bowl and raised to a vertical position allowing access thereto.

The lighting apparatus 10 is activated to provide light when an individual enters a bathroom at night and allow the user to see the toilet 12 and determine if the toilet seat 20 is up or down without turning on a bathroom light through a red light 26 or green light 28. The lights 26 and 28 may be, for example LED'S or a variation thereof such as LED strip lights.

Figure 2:
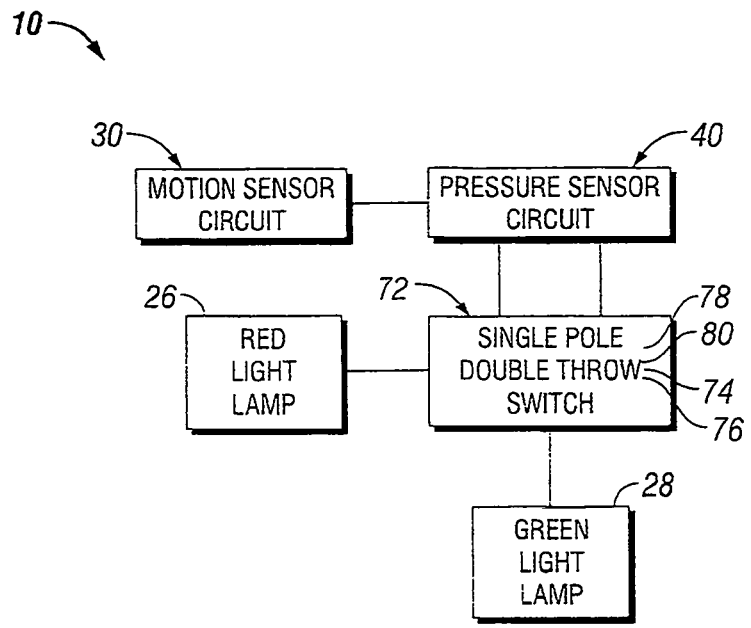
FIG. 2 is a block diagram of a lighting apparatus for a toilet in accordance with the principles of the invention.
Figure 3:
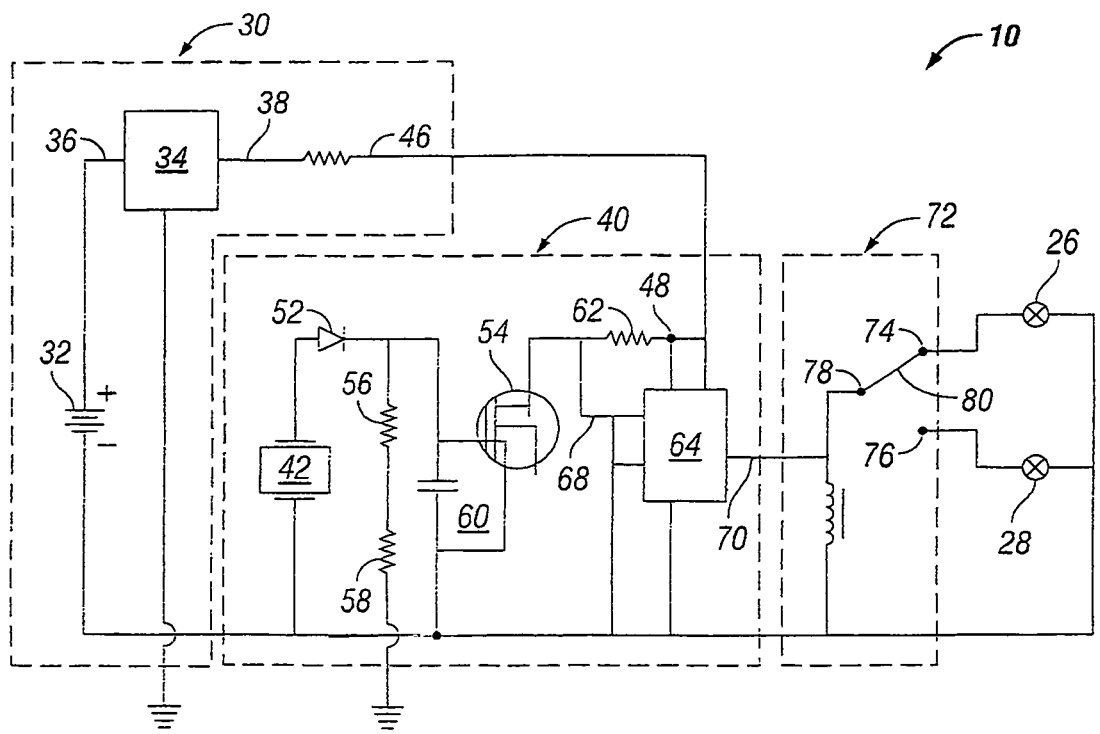
FIG. 3 is a schematic electrical circuit used in conjunction with the toilet which provides light in accordance with the principles of the invention.

As illustrated in FIGS. 2 and 3 the toilet seat lighting apparatus 10 is provided with a motion sensor circuit, generally designated, by the numeral, 30 which detects motion when an individual enters the bathroom. The motion sensor circuit 30 includes a power source 32 and a motion sensor 34 which detects the motion. The power source 32 which may be, for example, a nine volt compact battery power source is coupled to the input 36 of the sensor 34 to provide a first predetermined voltage signal at output terminal 38 of the sensor when motion is detected. When no motion is detected no voltage signal is provided at output terminal 38.

A pressure sensor circuit, generally designated by the numeral, 40 is provided including a pressure switch 42 and associated circuit including a diode 52 a mosfet 54, resistor 56 and 58, capacitor 60, resistor 62 and an integrated circuit 64. The motion sensor circuit 30 supplies power to the pressure sensor circuit 40 from its output 38 through a resistor 46 which functions in a well known manner to inputs 48 of the integrated circuit 64. The pressure switch 42 is mounted on an upper rim 50 of the toilet bowl 14 and provides a signal though diode 52 to the mosfet 54 which in turn provides signals to the integrated circuit 64 and inputs 68 thereof. As a result when pressure is applied to the pressure switch 42 by moving the toilet seat 20 to a horizontal position to engage the switch a first predetermined pressure control signal is generated, so that mosfet 54 is fired by the first predetermined pressure control signal to enable the integrated circuit 64 and provide a first predetermined output signal at the output 70 thereof. When the seat 20 is moved to a vertical position to release the pressure on the switch 42 the mosfet 54 does not fire and a second predetermined pressure control signal is generated thereby disabling the integrated circuit 64 and providing a second predetermined output signal at the output 70 thereof.

A single pole double throw switch, generally designated, by the numeral, 72 is coupled to the output 70 of the integrated circuit 64. The integrated circuit 64 is provided to activate the single pole double throw switch 72 when it receives signals from the pressure sensor circuit 40. The single double throw switch 72 includes switch contacts 74, 76 and 78 and a switching member 80. When the switch 72 receives the first predetermined output signal from the pressure sensor circuit 40 it operates in a first switching mode creating a normally closed switch circuit path between terminals 74 and 78 by switching member 80 and a normally open switch circuit path between terminals 76 and 78. When the switch 72 receives the second predetermined output switch signal from the pressure sensor circuit 40 it operates in a second switching mode and a normally open switching path is created between terminal 74 and 78 (not shown) and a normally closed switching path is created between terminals 76 and 78 by switching member 80. Accordingly when the switch 72 is activated by the pressure sensor circuit 40 to a first switching mode the switch turns on the red lamp 26 and turns off lamp 28 and when the switch is operating in the second switching mode the red lamp 26 is turned off and the green lamp 28 is turned on. As a result when an individual enters the bathroom at night to use the toilet 12 the motion sensor circuit 40 generates a signal which will turn on the red light 26 if the toilet seat is down or turn on the green light 28 if the toilet seat is up.

Accordingly, the toilet seat lighting apparatus 10 may be in a single package and mounted on the toilet so that the individual circuit components are essentially together. Similarly the lights may be coupled to a different part of the toilet depending on which lights or light configuration is used without departing from the spirit and scope of the invention.

The invention has been shown and disclosed in what is considered to be a practical and preferred embodiment. However, it should be recognized that changes may be made by those skilled in the art without departing from the spirit of the invention.

What is claimed:

1. A lighting apparatus for a bathroom toilet including:
   motion sensing means for detecting motion when an individual enters a bathroom;
   pressure sensing means for detecting pressure when a toilet seat of the toilet is moved to a horizontal position;
   first means responsive to the motion sensing means and pressure sensing means for generating a first predetermined signal when motion and pressure are detected and for generating a second predetermined signal when only motion is detected;
   a first illuminating means for providing light in the bathroom and for providing an indication when the toilet seat is down;
   a second illuminating means for providing light in the bathroom and for providing an indication when the toilet seat is up;
   a second means responsive to the first means for activating the first illuminating means when the first predetermined signal is generated and for activating a second illuminating means when the second predetermined signal is generated.

2. A lighting apparatus for a bathroom toilet as defined in claim 1 wherein the motion sensing means is aligned in couplingly engagement with the bowl of the toilet.

3. A lighting apparatus for a bathroom toilet as defined in claim 2 wherein the pressure sensing means is couplingly aligned for engagement on an upper rim of the toilet bowl so that the toilet seat will engage the pressure sensing means when the toilet seat is moved to a horizontal position and so that the toilet seat will disengage from the pressure sensing means when the toilet seat is moved to a vertical position.

4. A lighting apparatus for a bathroom toilet as defined in claim 3 wherein the pressure sensing means includes a pressure switch coupled to the upper rim of the toilet bowl in alignment with the toilet seat.

5. A lighting apparatus for a bathroom toilet as defined in claim 4 wherein the motion sensing means includes a motion sensor coupled to an outer portion of the toilet bowl in alignment with and electrically coupled to the pressure switch.

6. A lighting apparatus for a bathroom toilet as defined in claim 5 wherein the first means includes portions thereof electrically coupled to the motion sensor and other portions thereof electrically coupled to the pressure switch.

7. A lighting apparatus for a bathroom toilet as defined in claim 6 wherein the second means includes a single pole double throw switch electrically coupled to the first means.

8. A lighting apparatus for a bathroom toilet as defined in claim 7 wherein the first and second illuminating means are electrically coupled to the second means so that the first and second illuminating means can be electrically activated.

9. A lighting apparatus for a bathroom toilet as defined in claim 8 wherein the first illuminating means includes a red light lamp.

10. A lighting apparatus for a bathroom toilet as defined in claim 9 wherein the second illumination means includes a green light lamp.

\* \* \* \* \*